Figure 1:
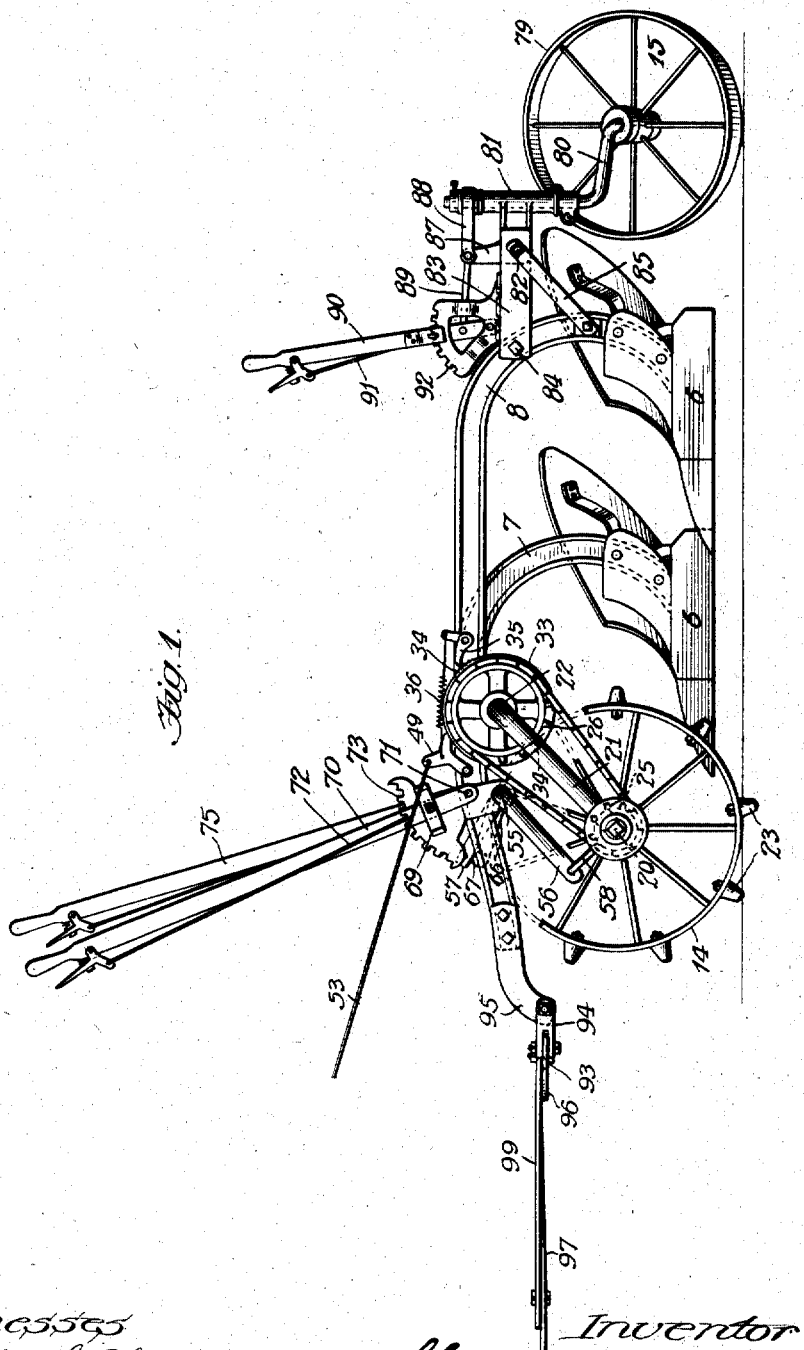

C. W. MICHAEL.
GANG PLOW.
APPLICATION FILED JUNE 26, 1916.

1,302,403.

Patented Apr. 29, 1919.
3 SHEETS—SHEET 1.

Witnesses
Martin H. Olsen.
Robert Dobberman

Inventor
Clement W. Michael
By Rector Hibben Davis & Macauley
His Atty's

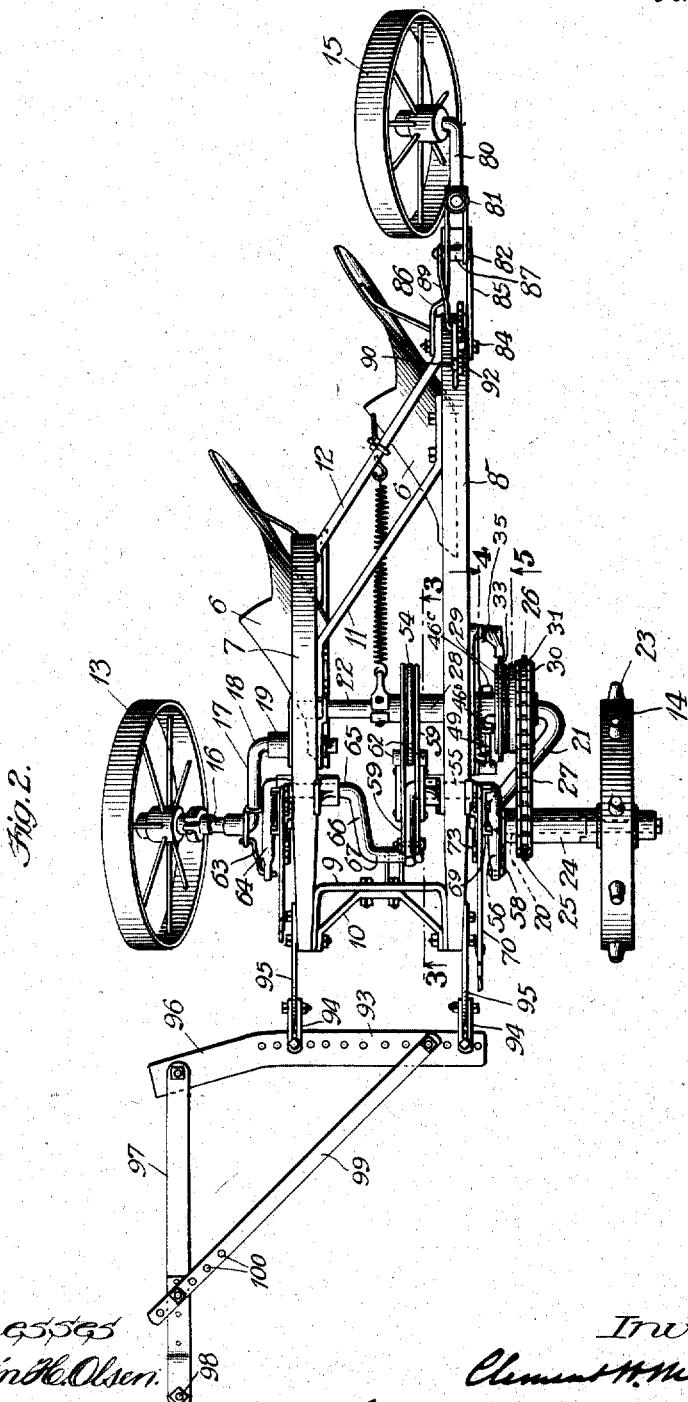

C. W. MICHAEL.
GANG PLOW.
APPLICATION FILED JUNE 26, 1916.
1,302,403.
Patented Apr. 29, 1919.
3 SHEETS—SHEET 3.
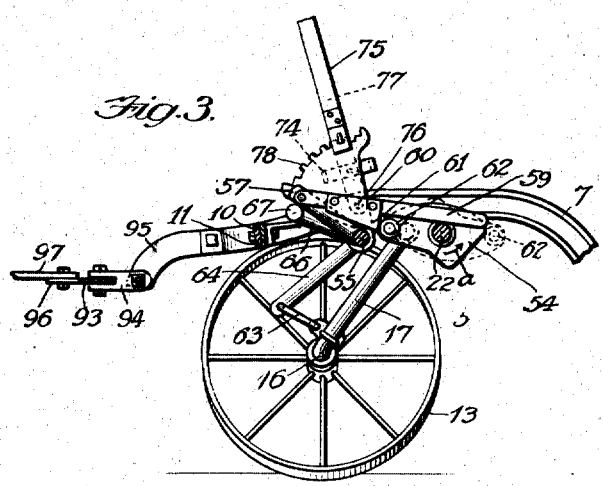
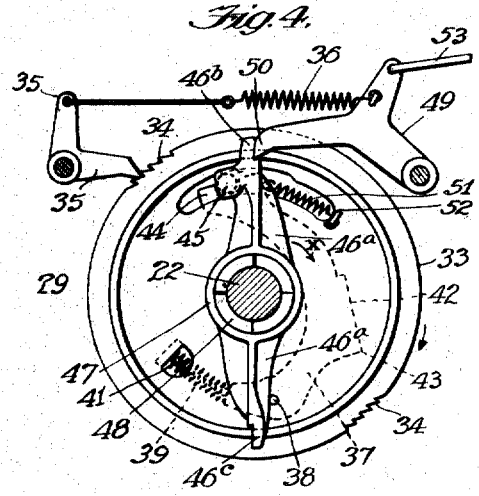
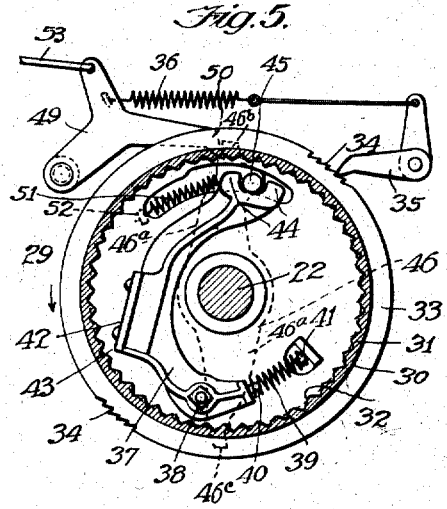
Witnesses
Martin H. Olsen
Robert Dobberman
Inventor
Clement W. Michael

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION OF WISCONSIN.

GANG-PLOW.

1,302,403.    Specification of Letters Patent.    Patented Apr. 29, 1919.

Application filed June 26, 1916. Serial No. 106,046.

*To all whom it may concern:*

Be it known that I, CLEMENT W. MICHAEL, a citizen of the United States, residing at Racine, county of Racine, Wisconsin, have invented certain new and useful Improvements in Gang-Plows, of which the following is a specification.

My invention relates more particularly to the means for raising and lowering and adjusting the plow bottoms with reference to the land and furrow wheels with a view to simplifying the mechanism and making the hand operation thereof easier to perform.

In the drawings accompanying this specification and forming a part of the application is shown a preferred form of the improved plow embodying my invention. It is to be understood, however, that the specific disclosure of the drawing and the following description is for the purpose of exemplification only and that the scope of the invention is defined in the following claims, in which I have endeavored to distinguish it from the prior art so far as known to me without, however, relinquishing or abandoning any portion or feature thereof.

In the accompanying drawings, Figure 1 is a side elevation, and Fig. 2 a plan of the form of the invention which has been chosen for exemplification; Fig. 3 a vertical longitudinal section on the line 3—3 of Fig. 2.; Fig. 4 a vertical longitudinal section on the line 4—4 of Fig. 2, looking in the direction of the arrows, and Fig. 5 a similar view on the line 5—5 of Fig. 2, likewise looking in the direction of the arrows.

In the several views each part is designated by the same reference character wherever it occurs.

The plow bottoms or shares 6, 6 are or may be of any usual or approved design and are attached to beams 7, 8 which form part of a rigid frame, being connected for this purpose by cross braces 9, 10, 11, 12. The beams 7, 8 form parallel longitudinal frame members to which are attached the wheels of the device, the front furrow wheel 13 being attached to the beam 7 and the land wheel 14 and rear furrow wheel 15 being attached to the beam 8, each of said wheels being vertically adjustable relative to said beams. Means is provided for adjusting all of said wheels by hand to regulate the depth of operation of the plow bottoms and means is also provided for raising the bottoms out of the ground engaging position and returning them thereto, the latter said means being power actuated and driven from the land wheel. Both the land wheel and the forward furrow wheel are mounted on pivoted arms which are rotated about their pivotal points and independently adjusted by means to be presently described. The front furrow wheel 13 is mounted on a bearing 16 which is in fact a prolongation of the arm 17, which is bent at 18, and journaled in a bracket 19 secured to the shaft 7. By swinging the arm 17 about its journaled end the front furrow wheel may be raised, lowered and adjusted as desired. Similarly the land wheel 14 is journaled upon the horizontal end 20 of a goose-necked bent cylindrical bar 21, the other end of which extends across beneath the two beams as at 22 and is journaled in supports attached to said beams. Thus by swinging the arm 21 about its journals in the frame the land wheel 14 can be raised and lowered with reference to said frame. Arms 17 and 21 are independently adjustable as to their positions when the bottoms are lowered to work the soil, but said arms are swung into their lower relative position to raise the plow bottoms or shares by the same mechanism driven from the land wheel. For this purpose the land wheel 14 which as shown is provided with spikes 23 to insure against slipping, engages the hub 24 of a sprocket wheel 25 also journaled upon the outwardly extending end 20 of arm 21, and a second sprocket wheel 26 of larger diameter is journaled upon the transverse journal portion 22 of the arm and freely revoluble with reference thereto. A chain 27 connects said sprocket wheels. Normally sprocket wheel 26 revolves idly as the plow is drawn forward. When, however, it is desired to raise or lower the plow bottoms relative to the frame the sprocket 26 is engaged with a sleeve 28 upon the journal 22, which sleeve carries means for swinging the arms 17 and 21.

The engagement between the sprocket and sleeve is effected by means of a clutch 29, the detail construction of which is shown in Figs. 4 and 5. The clutch member attached to the sprocket and therefore constantly driven consists in a wheel 30 having a peripheral, lateral, annular flange 31, the interior of which is serrated as at 32 for engagement by the other or driven portion of said clutch. The driven member of the clutch comprises a disk 33, the periphery of which is formed with ratchet teeth 34 at two diagonally opposite points upon its edge for coöperation with a pawl 35 which is maintained in contact with said disk by a spring 36 for a purpose which will presently appear. Upon the face of said disk adjacent the driving member of said clutch but concentric to said disk a dog 37 is pivoted at 38 and normally retained in the retracted position shown in Fig. 5 by a spring 39 interposed between a stud 40 on the short end of said dog and a stop or lug 41 on said disk. The dog 37 is provided with a wear plate 42, the angle or corner 43 of which is adapted when the dog is shifted, as will presently appear, to engage the internal serration on the flange of the driven clutch member heretofore described. Normally, however, the spring 39 holds the dog out of engagement with said flange. The longer end of the dog is formed with a pair of ears 44 which receive between them a pin or stud 45 upon a dog controlling member 46. The latter is sleeved as at 47 upon the hub 48 of disk 33 so as to be free to move independently thereof. A latch 49 is pivoted to the frame of the machine adjacent the clutch and its nose 50 ordinarily extends into the path of the arms 46ª, 46ª, being held in position to engage the notched ends 46ᵇ, 46ᶜ of said arms by spring 36 which, as shown in Fig. 4, connects the pawl 35 heretofore described, with said latch 49. A powerful tension spring 51 connects that arm 46ª which carries the pin 45 with a lug 52 on disk 33.

Latch 49 is normally in engagement with one of the arms 46ª. When it is desired to throw the clutch members into engagement the latch 49 is drawn out of engagement with arm 46ª as, for example, by means of a cord 53 which extends to a position convenient to the operator. When the latch is withdrawn the spring 51, being superior in power to the spring 39, shifts arms 46ª in the direction of the arrow $x$ thereby through pin 45 thereon carrying the dog 37 against the force of the spring 39 into engagement with the internal rack 32. When this happens the parts of the clutch revolve together until the other arm 46ª comes in contact with the latch 49 if the latter has been allowed to return to normal position in the meantime. Thereupon the continued movement of the disk withdraws the dog from engagement with the internal rack, the pin 45 permitting only a limited further movement of said dog. The disk 33 is finally arrested because the parts just referred to are held stationary and the pawl 35 engaging one of the series of ratchet teeth 34 prevents backward movement of the disk, and thus maintains the dog 37 out of engagement with its rack. The driven side of the clutch is thus held from further movement until the latch 49 is again withdrawn. Because of the provision of two diametrically opposite arms 46ª which alternately engage the latch 49, the driven clutch member makes a half revolution every time it is released.

The driven clutch member is rigidly secured to or mounted upon the sleeve 28 to which reference has been made, which carries at its other end a cam plate 54 which has the function of lowering the land wheel and front furrow wheel relatively to the frame of the plow at each alternate half revolution of said cam plate. The connections by which this operation is accomplished are shown in Figs. 1, 2 and 3. I have heretofore referred to the fact that the land wheel and front furrow wheel are journaled respectively upon the free ends of arms attached to the plow frame and which may be swung about their journals independently in order to raise and lower said wheels. The shaft 55 is journaled on that side of the frame which is adjacent the land wheel and is formed or provided with arms 56, 57 at its respective opposite ends, the former of which is connected by a link 58 with arm 21, (see Figs. 1 and 2). The other arm 57 of said shaft extends at an angle to said shaft and to arm 56, and is pivoted between side bars 59, 59 which extend rearwardly therefrom and over the sleeve 28 carrying the cam plate. Each of said bars 59 carries a cheek plate 60, which cheeks extend below said bar as at 61 (Fig. 3) forming an abutment, which is engaged by a roller 62 upon said cam plate. The cam plate 54 is so arranged upon the sleeve with reference to the driven member of the clutch that in one of the two positions of the driven member the roller 62 is in its forward extreme position as shown in full lines in Fig. 3, and in the other position of said driven clutch member the roller is at the other extreme position, as shown in dotted lines in said figure. The cam moves in the direction of the arrow $a$ in Fig. 3, and it will be apparent that as it moves from the dotted line position to the full line position it will carry the structure comprising the cheek plate 61 and side bars 59 forwardly to the position shown in Fig. 3, thus rocking the shaft 55 through its arm 57 and through arm 56 and link 58, swinging the land wheel to its lowered position with respect to the frame of the plow. At the same time that the land wheel is lowered the front furrow wheel is also lowered, the arm 17 carrying the said furrow wheel being connected by a link 63 with an arm 64 upon a shaft 65, which is mounted transversely of the plow beneath the beam 7 thereof. The other end of the shaft 65 carries an arm 66 which at its outer end is formed with a portion 67 which extends into the path of arm 57 to which reference has heretofore been made. Preferably the arms on shafts 55 and 65 are formed integral therewith by bending the cylindrical bars from which said shafts are formed at suitable points in suitable directions. It will now be seen that when the cam plate forces the parallel bars forwardly the arm 57 upon the shaft 55 engages the end 67 of the arm upon the shaft 65, and forces the latter downwardly, and this motion is transmitted to the arm 17 carrying the front furrow wheel which is therefore lowered at the same time with the land wheel, though the relative amounts of movement of the two wheels may be varied in the designing of the device. With the parts in the position just described, and as shown in full lines in Figs. 1, 2 and 3, when the latch 49 is again tripped the succeeding half revolution of the driven member of the clutch carries the roller 62 away from the cheek pieces 60, the downward movement of the side bars being limited by their contact with the sleeve 28. This leaves the arms carrying the land wheel and furrow wheel respectively free to swing upward, though the extent of this upward movement is limited as hereinafter described. With the land and furrow wheels in the position shown, the plow bottoms are carried free from the ground, but when the roller on the cam plate no longer holds the parts in the position shown in Fig. 3, the plow bottoms drop to the ground and are in position to enter the soil. The extent of the depth of penetration, however, is limited by adjustable stops which engage the arms 56 and 64 respectively. The stop 69 for the arm 56 which regulates the position of the land wheel, is carried by a hand lever 70 pivoted at 71 upon the frame and having a pawl 72 engaging an arcuate rack 73 upon the frame. The relative upward movement of the front furrow wheel is limited by a stop 74, upon a hand lever 75, pivoted to the frame at 76 and provided with a pawl 77 which engages an arcuate rack 78 upon the frame. As the plow is drawn forward with the bottoms in contact with the ground the latter penetrate the soil, the land wheel and furrow wheel swinging upward as the plow bottoms go deeper until arrested by the stops just described. As heretofore observed the land wheel and furrow wheel are thus independently adjustable and it is to be further noted that the hand levers may be adjusted when the parts are in the positions shown in Figs. 1, 2 and in full lines in Fig. 3, at which time there is no pressure upon the stops or the levers carrying them, thus rendering the manipulation of the latter exceedingly easy and requiring no expenditure of effort.

The rear furrow wheel 79 is provided with an independent adjustment which is operated entirely by hand. Said wheel is carried by an arm 80 which is bent as shown and journaled in a sleeve 81 forming part of a casting which is pivoted at 82 to an auxiliary beam 83 bolted to beam 8 at 84, and held in position by a pair of diagonal struts 85, 86. The pivoted casting is formed with an upturned arm 87, which at its upper end is connected by a brace 88 with said sleeve 81, and said arm is connected by a link 89 with a hand lever 90 for adjusting the position of said casting, and consequently of the rear furrow wheel. A pawl 91 on the hand lever engages an arcuate rack 92 for locking the parts in adjusted position. The plow is designed particularly for use in connection with a mechanical tractor and comprises or is provided with a hitch consisting of a transverse bar 95 connected by links 94 to frame extensions 95 upon the respective beams, the transverse bar or member being provided with a series of holes for adjusting the connection. The transverse bar is extended on the furrow side as at 96, where it is provided with a link 97 for attachment as at 98 to the rear bar of a tractor; a diagonal brace 99, which is adjustable by means of a series of perforations 100, holds the link 97 in proper relation to the draw bar.

The hand levers 70, 75, are inclined forwardly as shown so that the plow may be adjusted by the tractor operator without leaving his position, and the cord 53, by which the latch is operated, is also carried to a convenient position for handling by the operator. It will be understood that for the purpose of moving the plow from place to place and turning the same about, the parts are brought to the position illustrated, and when the furrow is to be turned the plow bottoms are dropped to the ground in the manner previously described and permitted to enter the soil until their penetration is limited by the stops as heretofore stated.

I claim:

1. In a device of the class described, a frame, ground working implements carried by the frame, supporting wheels vertically and independently movable with respect to the frame, means for lowering said wheels with respect to the frame and permitting them to freely rise with respect thereto and independently adjustable stops for limiting the rising movements of the respective wheels.

2. In a device of the class described, a frame, ground working implements carried by the frame, supporting wheels vertically and independently movable relatively to the frame, a common means for lowering the supporting wheels and for releasing the same to permit them to move upwardly with respect to the frame, and separate and independently adjustable stops adapted and arranged to limit the upward movement of the respective wheels.

3. In a device of the class described, a frame, ground working implements secured to the frame, a pair of arms independently pivoted to said frame, a wheel journaled on each arm, a common means for lowering said wheels relatively to the frame, a pair of independently adjustable stops adapted to limit the upward relative movement of the respective wheels.

4. In a device of the class described, a frame, ground working implements carried by the frame, a pair of arms independently journaled on the frame, one of said arms carrying a furrow wheel journaled thereon, a land wheel journaled on the other of said arms, common means for lowering said arms and wheels relative to the frame operating connections between said means and the land wheel whereby said means is driven from said wheel, and independently adjustable stops for limiting the upward movements of the respective arms.

5. In a device of the class described, a frame, ground working implements carried thereby, an arm 17 journaled in the frame and carrying a furrow wheel, an arm 21 journaled in said frame and carrying a land wheel, common means for swinging said arms, a connection from said land wheel to said means for operating the latter comprising a normally open clutch means for throwing the clutch into engagement, and independently adjustable stops for limiting the upward movements of the respective arms.

6. In a device of the class described, a frame, ground working implements carried thereby, an arm 17 journaled in the frame, a furrow wheel journaled on said arm, an arm 21 journaled in the frame, a land wheel 14 carried by said arm, means common to said arms for lowering the same relative to the frame, a sprocket on arm 21 connected to the land wheel to be turned thereby, a sprocket concentric with the journal of the arm 21, a chain connecting said sprockets, common means for lowering said arms, connections between said means and the last said sprocket including a hand controlled clutch whereby said means is driven from the land wheel, and independently adjustable stops for limiting the upward movements of the respective arms.

7. In a device of the class described, a frame, ground working implements carried by the frame, an arm 17 pivoted on one side of the frame, a furrow wheel carried by said arm, a crank shaft journaled on said frame, an arm on said shaft, a connection between said arm and the arm 17, an arm 21 journaled in said frame, a land wheel carried by the last said arm, a rock shaft journaled in the frame, a connection from the rock shaft to the arm 21 whereby the latter is raised and lowered, means including a cam shaft for rocking said rock shaft, operating connections between said means and the land wheel whereby the former is driven by the latter.

8. In a device of the class described, a frame, ground working implements carried by the frame, an arm 17 journaled in the frame and carrying a furrow wheel 13, an arm 21 journaled in the frame and carrying a land wheel, a rock shaft mounted in the frame and connected at one end to the arm carrying the land wheel, mechanism driven by the land wheel for oscillating said rock shaft, a second rock shaft journaled in the frame having an arm connected to arm 17 and a second arm adapted to be engaged by an arm on the first said rock shaft and independently adjustable stops for limiting the motion of said rock shafts.

9. In a device of the class described, a frame, ground working implements carried thereby, an arm 17 journaled in the frame, a furrow wheel journaled on said arm, a rock shaft, an arm on said rock shaft, a link connecting said rock shaft to the arm 17, a second arm on said rock shaft, an arm 21 journaled on the frame, a land wheel carried by said arm, a second rock shaft journaled on the frame, an arm thereon, a link connecting the last said arm to arm 21, a second arm on the last said rock shaft adapted to engage the second said arm on the first mentioned rock shaft, means engaging the second arm on the second said rock shaft for operating the latter and mechanism driven by the land wheel for driving said means.

10. In a device of the class described, a frame, ground working implements thereon, an arm 21 journaled on the frame, a land wheel journaled on said arm, a rock shaft journaled on the frame, an arm on said rock shaft, a link connecting said arm to the arm 21, a shaft mounted on the frame, a cam carried thereby, connections between the cam and said rock shaft for rocking the latter, mechanism whereby the said cam and its shaft are driven from the land wheel, an arm 17 journaled upon the frame, a furrow wheel journaled upon the arm, a second rock shaft having an arm engaged by an arm on the first said rock shaft and an arm connected by a link to the arm 17 and independently adjustable stops for limiting the movements of said rock shafts.

11. In a device of the class described, a frame, ground working implements carried by the frame, a transverse shaft 22 journaled in the frame, an arm 21 mounted on said shaft, a journal on said arm, a ground wheel and a sprocket mounted on said journal, and connected together, a sprocket mounted on the shaft 22, a chain connecting said sprockets, a sleeve 28 on shaft 22, a clutch between said sleeve and sprocket whereby when the clutch is in engagement the sleeve is rotated, a cam on the sleeve, a rock shaft mounted on the frame, an arm on the rock shaft, a link connecting said arm with the arm 21, a second arm on the rock shaft, and means operated by the cam and engaging the last said arm for swinging the rock shaft.

12. In a device of the class described, a frame, ground working implements on the frame, a transverse shaft 22 journaled in the frame, an arm 21 on said shaft, a journal mounted on said arm, a land wheel and a sprocket mounted on the journal, a sprocket mounted on the transverse shaft 22, a chain connecting said sprockets, a sleeve 28 mounted on shaft 22, a cam 54 mounted on said sleeve, a clutch one section whereof is rigid with said sleeve and the other section rigid with the sprocket on shaft 22, means for engaging said clutch and causing the driven member thereof and the attached sleeve to make a half revolution, a rock shaft, an arm on said rock shaft, a reciprocating member connected to said arm and engaged by said cam for oscillating said rock shaft, a second arm on said rock shaft and a link connecting said second arm and the arm 21.

13. In a device of the class described, a frame, ground working implements carried by the frame, an arm 17 journaled in the frame, a furrow wheel journaled on said arm, a shaft 22 journaled transversely of the frame, an arm 21 on said shaft, a ground wheel and a sprocket wheel journaled on said arm 21 and connected together, a sprocket on the shaft 22, a sleeve on said shaft 22, a clutch intermediate said sleeve and sprocket, the driving member of which is connected to said sprocket and the driven member to said sleeve, means for throwing said clutch members into engagement, means for throwing them out of engagement after a half revolution has been completed, a cam on said sleeve, a rock shaft, an arm on said rock shaft, a link connecting said arm and the arm 21 carrying the land wheel, a second arm on said rock shaft, a follower connected to said second arm, an abutment on the follower adapted to be engaged by said cam to oscillate the rock shaft, an adjustable stop movable independently of the rock shaft and adapted to engage an arm thereon to limit its movement, a second rock shaft, an arm on said second rock shaft extending into the path of movement of one of the arms on the first said rock shaft, a second arm on the second said rock shaft, a link connecting said second arm to the arm 17 and an adjustable stop for limiting the movement of the second rock shaft.

CLEMENT W. MICHAEL.

Copies of this patent may be obtained for five cents each, by addressing the "Commissioner of Patents, Washington, D. C."